(12) United States Patent
Amat

(10) Patent No.: US 10,618,631 B2
(45) Date of Patent: Apr. 14, 2020

(54) REINFORCED BLADE AND SPAR

(71) Applicant: Ratier-Figeac SAS, Figeac (FR)

(72) Inventor: Pascal Amat, Figeac (FR)

(73) Assignee: RATIER-FIGEAC SAS, Figeac (FR)

( * ) Notice: Subject to any disclaimer, the term of this patent is extended or adjusted under 35 U.S.C. 154(b) by 211 days.

(21) Appl. No.: 15/808,982

(22) Filed: Nov. 10, 2017

(65) Prior Publication Data

US 2018/0127087 A1 May 10, 2018

(30) Foreign Application Priority Data

Nov. 10, 2016 (EP) .................................. 16306477

(51) Int. Cl.
| | |
|---|---|
| *B64C 11/26* | (2006.01) |
| *B64C 11/20* | (2006.01) |
| *B32B 3/12* | (2006.01) |
| *B32B 5/18* | (2006.01) |
| *D05B 1/24* | (2006.01) |
| *D05B 85/00* | (2006.01) |
| *D05B 85/06* | (2006.01) |
| *D05C 17/02* | (2006.01) |

(52) U.S. Cl.
CPC ................ *B64C 11/20* (2013.01); *B32B 3/12* (2013.01); *B32B 5/18* (2013.01); *B64C 11/205* (2013.01); *B64C 11/26* (2013.01); *D05B 1/24* (2013.01); *D05B 85/006* (2013.01); *D05B 85/06* (2013.01); *D05C 17/02* (2013.01); *B32B 2603/00* (2013.01); *D10B 2505/00* (2013.01)

(58) Field of Classification Search
CPC ....... B64C 11/20; B64C 11/205; B64C 11/22; B64C 11/26; B64C 11/00; D05B 1/24; D05B 85/06; D05B 85/006

USPC ......................................................... 416/226
See application file for complete search history.

(56) References Cited

U.S. PATENT DOCUMENTS

| | | |
|---|---|---|
| 1,901,864 A | 3/1933 | Bellanca |
| 4,206,895 A | 6/1980 | Olez |
| 4,664,961 A | 5/1987 | Vees et al. |
| 5,308,228 A | 5/1994 | Benoit et al. |
| 6,024,325 A | 2/2000 | Carter |
| 6,431,837 B1 | 8/2002 | Velicki |
| 7,247,212 B2 | 7/2007 | Kostar et al. |
| 7,600,978 B2 | 10/2009 | Vance et al. |
| 8,357,323 B2 | 1/2013 | Morrison et al. |
| 9,248,612 B2 | 2/2016 | Zhu et al. |
| 2010/0178495 A1* | 7/2010 | Taketa .................... B29C 70/14 428/339 |

(Continued)

FOREIGN PATENT DOCUMENTS

| | | |
|---|---|---|
| EP | 2653380 A2 | 10/2013 |
| FR | 2684719 A1 | 6/1993 |
| GB | 2249592 A | 5/1992 |

OTHER PUBLICATIONS

European Search Report for Application No. 16306477.7-1754 dated May 16, 2017, 6 Pages.

*Primary Examiner* — Richard A Edgar
*Assistant Examiner* — Maxime M Adjagbe
(74) *Attorney, Agent, or Firm* — Cantor Colburn LLP

(57) ABSTRACT

A spar for an airfoil comprises a core, e.g. a foam core, a central structural member extending through the core, an outer structural layer surrounding the core and central structural member and a plurality of yarns extending through the central structural member.

17 Claims, 3 Drawing Sheets

(56) References Cited

U.S. PATENT DOCUMENTS

2013/0280084 A1* 10/2013 Nagle ................... B64C 11/26
416/226

* cited by examiner

REINFORCED BLADE AND SPAR

FOREIGN PRIORITY

This application claims priority to European Patent Application No. 16306477.7 filed Nov. 10, 2016, the entire contents of which is incorporated herein by reference.

TECHNICAL FIELD

The present disclosure relates to reinforced propeller blades and reinforced spars for propeller blades.

BACKGROUND

Propeller blades may include a structural spar to increase the structural strength of the blade. The structural spar may include an I-beam stiffener therein to further improve structural integrity thereof. However such stiffeners may be subject to delamination, for example between the I-beam and other spar materials. Delaminations may induce scratches in the blade during manufacture and lead to reduced service life of the blade. The delaminations also require expensive periodic inspections. Furthermore I-beams can be distorted during manufacture particularly when being compressed by a closing resin mould, for example, this can also result in delamination or undesirable radii geometry.

SUMMARY

In accordance with this disclosure, there is provided a spar for an airfoil comprising a central structural member, an outer structural layer surrounding the central structural member and a plurality of yarns extending through the central structural member.

The spar may further comprise a core. The central structural member may extend through the core and the outer structural layer may surround the core. The core may be formed from a foam or honeycomb material or may be a hollow core.

The yarns may extend through the central structural member and the outer structural layer.

The central structural member may be formed from two parts and the yarns may extend through both parts of the central structural member.

The central structural member may be an I-beam stiffener formed from two C-shaped parts each having a central portion and two outer flange portions. The C-shaped parts may be attached to one another at their respective central portions and the yarns may extend through the central portions of both C-shaped parts at the attachment.

The yarns may extend through the central portions at at least two different positions across the thickness of the spar and a plurality of yarns may extend through the central portions at each of the positions.

The outer structural layer may comprise a composite layer and the central structural member may be an I-beam stiffener and wherein the yarns extend through the composite layer and the outer flange portions of the I-beam stiffener.

The yarns may extend through the central structural member at a plurality of positions along the span of the spar.

The central structural member may extends along the span of the spar from a first end adjacent the root of the spar to a second end adjacent the tip of the spar and a plurality of yarns may extend through central structural member between or adjacent the first end and second end.

A propeller blade may comprise the spar as set forth in any of the embodiments above, the spar extending along substantially the entire length of the propeller blade.

This disclosure also provides a method of manufacturing a spar as set forth in any of the embodiments above. The method includes forming a central structural member, surrounding the central structural member with an outer structural layer and threading a plurality of yarns through the central structural member.

The method may further include attaching a core material to the central structural member such that the central structural member extends through the core material and the outer structural layer surrounds it.

The step of threading may be performed after the step of surrounding, and the yarns may be threaded to extend through the structural layer and the central structural member.

The threading may be performed by blind stitching the yarns from one side of the central structural member.

The step of threading may be performed before the step of surrounding.

The step of threading may comprise threading the yarns through two parts of the structural member to assist in joining the two parts together.

The threading may be performed with a vibrating needle, by pinning or by tufting.

Forming the central structural member may include shaping the central structural member around a preform mould. The preform mould may include cut-outs to facilitate threading of the yarns.

BRIEF DESCRIPTION OF DRAWINGS

Some embodiments of the disclosure will now be described by way of example only and with reference to the accompanying drawings in which.

DETAILED DESCRIPTION

Figure 1:
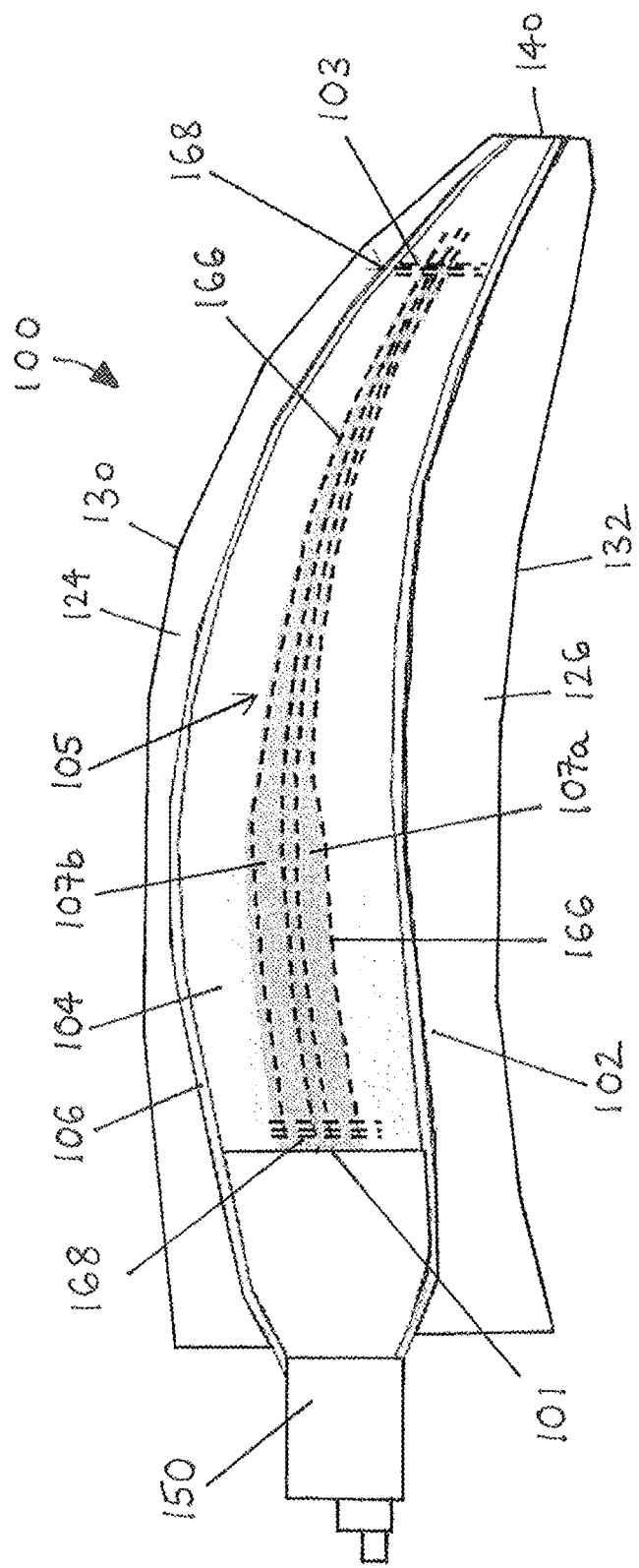
FIG. 1 shows a propeller blade according to the invention including spar having an I-beam stiffener.

With reference to FIG. 1, an exemplary propeller blade 100 is illustrated. The propeller blade 100 has a leading edge 130, a trailing edge 132 a root 150 and a tip 140. The blade 100 further includes a structural spar 102, a leading edge insert 124 and a trailing edge insert 126.

Figure 4:
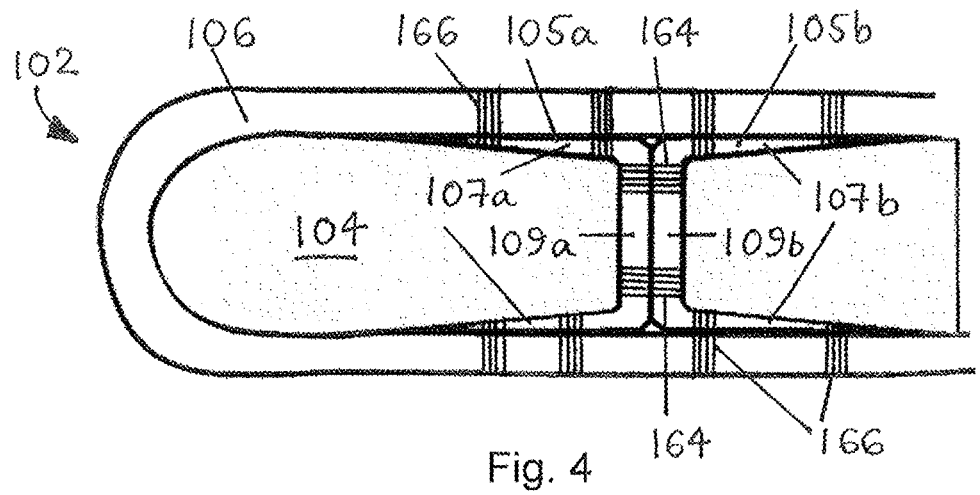
FIG. 4 shows a cross-sectional view of the spar of FIG. 1.

The propeller blade 100 includes a spar 102 having a foam or other lightweight material core 104 and an I-beam stiffener 105 disposed therein. As can be seen in FIG. 4, the stiffener 105 is formed from two C-shaped sections 105a, 105b, each having central connecting portions 109a, 109b and flange portions 107a, 107b at each end of the connecting portions 109a, 109b. The C-shaped sections 105a, 105b are secured to one another, back-to back, such that they form an "I" shape having four flange portions 107a, 107b. The flange portions 107a, 107b are located on an outer surface of the foam core 104. Connecting portions 109a, 109b are disposed through a slot formed in the foam core 104. The connecting portions 109a, 109b are attached to and connect at least two of the flange portions 107a, 107b. As can be seen from FIG. 1, the length of the flange portions 107a, 107b may decrease towards the tip 140 of the blade 100. The I-beam stiffener 105 may be formed of carbon or glass fibre composite materials, for example.

The I-beam stiffener 105 extends along the length of the spar 102 from a first end 101 adjacent the root 150 of the blade 100 to a second end 103 adjacent a tip of the spar 102. In the illustrated embodiment, the spar 102 extends along the entire span of the blade 100 and the I-beam stiffener 105 extends along the majority of the length (such as greater than 50% of the length) of the spar 102. It will be appreciated that, in other embodiments, the spar 102 may extend along a lesser portion of the span of the blade 100 and thereby terminate at a position spaced from the tip 140 of the blade 100. Furthermore, it will be appreciated that the I-beam stiffener 105 may extend along a greater or lesser extent of the spar 102. For example, the I-beam stiffener may extend along the entire span of the spar 102 or may extend along a smaller proportion of the span (such as less than 50%) of the spar.

The foam core 104 and I-beam stiffener 105 are surrounded by a structural layer 106. The structural layer 106 is typically formed from a carbon fibre material such as a dry braided carbon fibre material, although other materials may be used as known in the art. The structural layer 106 may be made from pre-impregnated material, or unimpregnated material, with a matrix material such as resin or thermoplastic material being impregnated into the structural layer 106 after it has been formed around the core 104. The blade 100 may further include lightweight e.g. foam, leading edge and trailing edge inserts 124, 126 and a shell (not shown) such as a Kevlar® sock, or a glass fibre or carbon fibre shell.

As shown in FIG. 4, the spar 102 includes stitches 164, 166 of yarn extending therethrough to improve the strength of the spar and prevent delamination. A first set of stitches 164 extend through the connecting portions 109a, 109b to secure the bonded interface between the two C-shaped portions 105a, 105b. A second set of stitches 166 extend through the structural layer 106 and flange portions 107a, 107b of the I-beam stiffener 105 to secure the bonded interface therebetween. By securing the bonded interface between the I-beam stiffener and the spar 102 and also between the two C-shaped portions 105a, 105b of the stiffener 105, it is possible to reduce the delamination propagation into the I-beam stiffener 105 and spar 102 and reduce the distortion of the I-beam during manufacture, particularly when compressed by a resin mould when closed around the I-beam.

The spar 102 according to the embodiment is manufactured according to the following method as illustrated in FIGS. 2 to 5.

Figure 2:
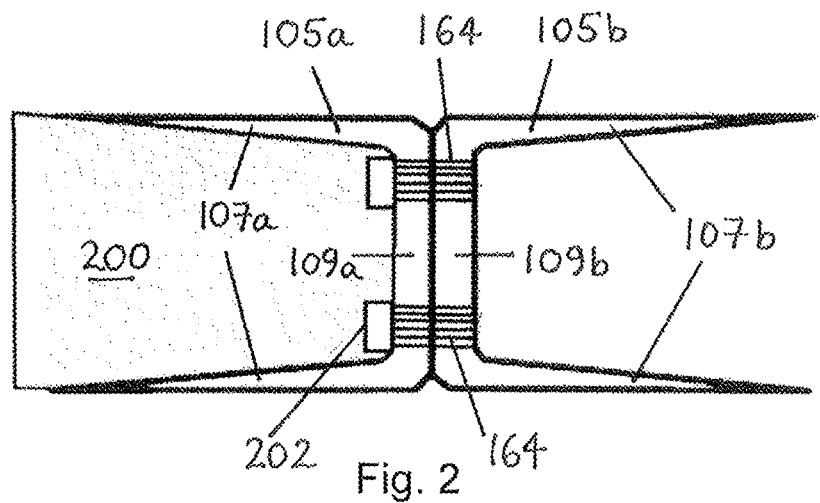
FIG. 2 shows a cross-sectional view of the I-beam stiffener of FIG. 1 during manufacture thereof.

Two C-shaped stiffening members 105a, 105b are assembled to form an I-beam stiffener 105, as shown in FIG. 2. The C-shaped members 105a, 105b may be bonded to one another by any means known in the art. For example the C-shaped members 105a, 105b may be attached to each other by adhesive (injection of resin), fastening members or may be heated to facilitate bonding therebetween. A plurality of yarns 164 are threaded between the two central connecting portions 109a, 109b.

Figure 5:
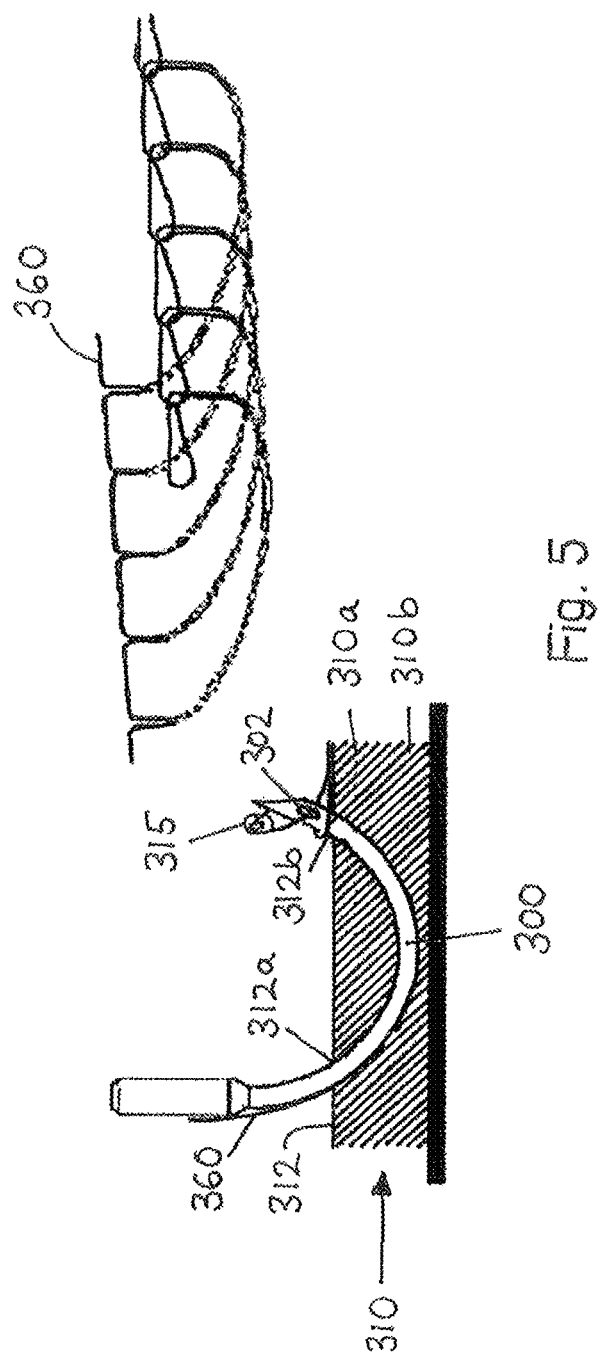
FIG. 5 shows an apparatus for blind stitching yarns through components of a spar.

The yarns 164 may be stitched through the components 105a, 105b using traditional stitching techniques, tufting or may be blind stitched. As shown in FIG. 5, blind stitching uses a curved needle 300, mounted to a stitching head 305 which moves the needle 300 though material 310. The yarn 360 is attached to the needle 300 through an eye 302 thereof. The needle 300 enters the material 310 at a first position 312a on the surface 312 thereof and exits the material 310 at a second position 312b on the same surface 312 adjacent a hook 315 which grabs the yarn to form a stitch on the surface 312. Blind stitching therefore allows the sewing together of two materials 310a, 310b from a single side 312 of the materials 310a, 310b.

Alternatively, the yarns 164 may be threaded through the components 105a, 105b using tufting. Tufting involves inserting the yarns 164 through the components, using a needle that, after insertion, moves back along the same trajectory leaving a loop of the yarn 164 on the bottom of the structure.

Alternatively the radial stitches 164 may be added during formation of the stiffener 105. For example, the stiffener 105 may be formed from two substantially straight members (not shown) which may be bonded to one another and stitched together along a central portion before the end portions are bent away from the central portions to form the flange portions 107 of the I-beam stiffener 105.

As shown in FIG. 2, a pre-form 200 may be used to facilitate forming of the I-beam stiffener 105 and stitching therein. The preform 200 has a shape corresponding to the desired shape of the foam core 104 and may be used as a mould or guide during bending of the stiffener 105 to form the flange portions 107 on the outer surfaces thereof. The preform 200 may include cut-outs 202 which may be positioned adjacent the connecting portions 109a, 109b of the stiffener 105 to allow the needle 300 to extend out of the connecting portion 109a during stitching.

Figure 3:
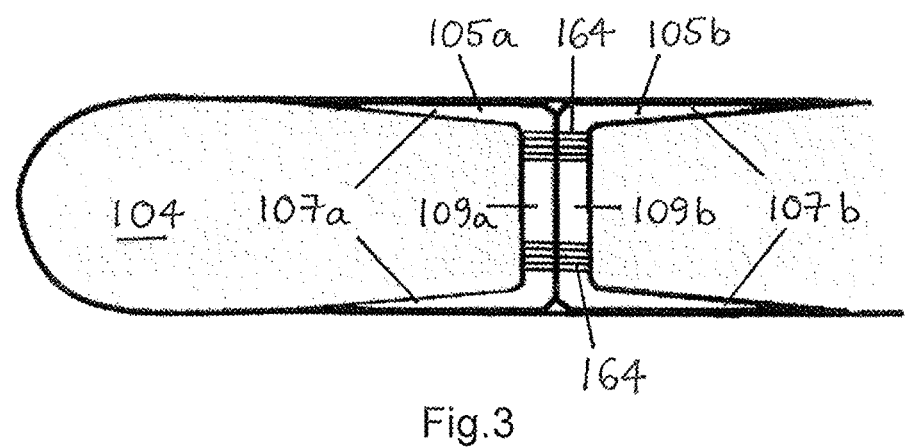
FIG. 3 shows the I-beam stiffener of FIG. 2 inserted into spar foam.

After stitching the yarn 164 through the I-beam stiffener 105, the foam core 104 is inserted between the flanges 109 of the stiffener 105 as shown in FIG. 3. Alternatively the foam core 104 may be formed around the stiffener 105. The foam core 104 may then be further machined to the desired shape. For example, the foam core 104 may be cut at a trailing edge thereof to achieve a desired profile. The foam core 104 may be formed by injection moulding for example, and may include a pre-preg layer bonded onto an outer surface of the foam 104.

The structural layer 106 of the spar 102 is then attached to the I-beam stiffener 105 and foam core 104 assembly as shown in FIG. 4. For example, a carbon material may be braided to an outer surface thereof or plies of material wrapped around the core 104 to form the structural layer 106. Further yarns 166 may then be threaded through the structural layer 106 and the flange portions 107a, 107b of the I-beam stiffener 105 to increase the bond strength therebetween.

The yarns 166 may be impregnated at this stage and co-cured with the curing of the structural layer 106. In embodiments where the core components are not pre-impregnated the yarns 166 may be impregnated during a resin transfer moulding process of the blade. In embodiments where the core components are formed from pre-impregnated materials the yarns 166 may be impregnated with resin flow due to pressure and temperature of the mould.

Where the foam core 104 is surrounded by a structural layer 106, as described above, standard stitching methods may be problematic due to the tough surface properties of the structural layer. With standard stitching methods there is a risk that the core 104 may be punctured and resin may infiltrate into the foam or honeycomb material during blade injection. In such embodiments, the threading of the yarns 166 through the I-beam stiffener 105 and the structural layer 106 may be performed by blind stitching (as described in relation to FIG. 9) such that the stitching marks run along but not through the surface of the structural layer 106 so as to avoid damage to the core 104. Blind stitching would also reduce or eliminate the need for cut-outs 300 of the preform 200. Alternatively, the threading may be performed by stitching with a vibrating needle. The vibration applied to the needle facilitates puncturing of the structural layer 106 which may be particularly beneficial for pre-impregnated components. In such embodiments the yarns 166 may extend beyond the interface between the I-beam stiffener 105 and structural layer 106 and into the foam core 104 to further reinforce the spar 102 through its thickness. In alternative embodiments, cured pins may be inserted through the pre-pegs, using an ultrasonic horn for instance, in order to insert the yarns 166.

The number and distance between the stitches of the yarns 164, 166 can be adjusted according to I-beam width and level of load expected on the propeller. The stitches may extend in either the span wise or chord wise directions or in both the span wise and chord wise directions.

As shown in FIGS. 2 to 4, the stitches or yarns 164 extending through the connecting portions 109a, 109b may be arranged in two distinct positions across the thickness of the spar 102. At each position, five yarns 164 extend through the connecting portions 109a, 109b. However it will be appreciated that a greater or lesser number of yarns 164 may be used depending on the strength requirements of the spar 102. The adjacent yarns 164 may be spaced from each other by 2 to 6 millimetres or between 3 and 5 millimetres. In a particular embodiment, the spacing between adjacent stitches is about 4 millimetres.

In the embodiment of FIG. 1, two rows of stitches of yarn 166 extend through each flange portion 107a, 107b and along the span of the spar 102. As such, four rows of stitches extend along the span of the blade 100 and through the flange portion 107a, 107b on each side of the spar 102. It will be appreciated that the stitches of yarn 166 might take other arrangements, for example greater or fewer rows of stitches. In other embodiments the stitches of yarn 166 may extend over only a portion of the span of the spar 102. As can be seen from FIG. 4, the flange stitches 166 of the embodiment includes several yarns extending through the flange portions 107a, 107b at each position. In the illustrated embodiment, four yarns 166 extend through the flange portions 107a, 107b at each position. It will be appreciated that a greater or lesser number of yarns 166 may extend through the flanges in each position. In another embodiment five yarns 166 might extend through the flange portions 107a, 107b at each position. The adjacent yarns 166 may be spaced from each other by 3 to 7 millimetres or between 4 and 6 millimetres. In a particular embodiment, the spacing between adjacent stitches is about 5 millimetres.

Referring again to FIG. 1, the spar 102, further includes stitches of yarn 168 extending in a chordwise direction across the spar 102 at either end 101, 103 of the I-beam stiffener to further reinforce the spar 102. The stitches 168 extend across the entire chordwise extent of the I-beam stiffener however it will be appreciated that a greater or lesser extent may be used according to the strength requirements of the spar 102. Where the I-beam stiffener 105 terminates in the spar 102 may be particularly prone to delaminations and/or distortion. As such further stitches of yarn 168 in these areas may further increase the structural integrity of the blade 100 as a whole. If required, additional yarns 168 could be added between I-beam extremities i.e. along the span, in portions where the blade may be overloaded.

Although the embodiments above comprise a foam or honeycomb core 104, it will be appreciated that the core material 104 may be removed from the spar 102 after the outer structural member 106 is added to leave a hollow or core-less spar 102.

All of the above stitching techniques may be performed automatically. For example, stitching may be performed by a robot having a stitching head and needle mounted thereto.

Although the described embodiments are applied to propeller blades, it will be appreciated that the invention may also be applied to fan blades or composite spinners where the stitching may improve static and fatigue strength and improve resistance to foreign object damage.

The invention claimed is:

1. A spar for an airfoil comprising:
a central structural member;
an outer structural layer surrounding the central structural member; and
a plurality of yarns extending through the central structural member
wherein the central structural member is an I-beam stiffener formed from two C-shaped parts each having a central portion and two outer flange portions and wherein the C-shaped parts are attached to one another at their respective central portions, the yarns extending through the central portions of both C-shaped parts at the attachment.

2. The spar of claim 1, further comprising a core, wherein the central structural member extends through the core and the outer structural layer surrounds the core.

3. The spar of claim 2, wherein the core is formed from a foam or honey comb material or wherein the core is hollow.

4. The spar of claim 1, wherein the yarns extend through the central structural member and the outer structural layer.

5. The spar of claim 1, wherein the yarns extend through the central portions at at least two different positions across the thickness of the spar.

6. The spar of claim 1, wherein the outer structural layer comprises a composite layer and wherein the yarns extend through the composite layer and outer flange portions of the I-beam stiffener.

7. The spar of claim 1, wherein the yarns extend through the central structural member at a plurality of positions along a span of the spar.

8. The spar of claim 1, wherein the central structural member extends along a span of the spar from a first end adjacent a root of the spar to a second end adjacent a tip of the spar, wherein a plurality of yarns extend through the central structural member between the first end and second end or adjacent thereto.

9. A propeller blade comprising the spar as set forth in claim 1, wherein the spar extends along substantially an the entire length of the propeller blade.

10. A method of manufacturing a spar that includes a central structural member, an outer structural layer surrounding the central structural member, and a plurality of yarns extending through the central structural member, wherein the central structural member is an I-beam stiffener formed from two C-shaped parts each having a central portion and two outer flange portions and wherein the C-shaped parts are attached to one another at their respective central portions, the yarns extending through the central portions of both C-shaped parts, the method comprising:
forming the central structural member;
attaching the C-shaped parts to one another at their respective central portions;

threading the plurality of yarns through the central portions of the central structural member to assist in joining the two C-shaped parts together; and surrounding the central structural member with the outer structural layer.

11. The method of claim 10, further comprising:

attaching a core material to the central structural member such that the central structural member extends through the core material; and surrounding the core material with the outer structural layer.

12. The method of claim 10, wherein yarns are also threaded to extend through the outer structural layer and the central structural member.

13. The method of claim 12, wherein the threading includes:

blind stitching the yarns from one side of the central structural member.

14. The method of claim 10, wherein step of threading is performed before the step of surrounding.

15. The method of claim 10, wherein the threading is performed with a vibrating needle, by pinning or by tufting.

16. The method of claim 10, wherein forming the central structural member includes shaping the central structural member around a preform mould.

17. The method of claim 16, wherein the preform mould includes cut-outs to facilitate threading of the yarns.

* * * * *